United States Patent
Adhikari et al.

(10) Patent No.: US 12,312,101 B2
(45) Date of Patent: May 27, 2025

(54) METHODS AND SYSTEMS FOR HYBRID DIGITAL TWIN DRIVEN HEALTH PREDICTIONS

(71) Applicant: The Boeing Company, Arlington, VA (US)

(72) Inventors: Partha Adhikari, Karnataka (IN); Deepu Vettimittathu Mathai, Karnataka (IN); Avik Sadhu, Karnataka (IN); Venkateswara K. Reddy, Karnataka (IN)

(73) Assignee: The Boeing Company, Arlington, VA (US)

(*) Notice: Subject to any disclaimer, the term of this patent is extended or adjusted under 35 U.S.C. 154(b) by 250 days.

(21) Appl. No.: 18/307,412

(22) Filed: Apr. 26, 2023

(65) Prior Publication Data
US 2024/0359826 A1   Oct. 31, 2024

(51) Int. Cl.
*B64F 5/60* (2017.01)
*G06N 3/006* (2023.01)
*G07C 5/00* (2006.01)
*G07C 5/08* (2006.01)

(52) U.S. Cl.
CPC .............. *B64F 5/60* (2017.01); *G06N 3/006* (2013.01); *G07C 5/008* (2013.01); *G07C 5/0808* (2013.01); *G07C 5/0816* (2013.01)

(58) Field of Classification Search
CPC ........... B64F 5/60; G06N 3/006; G07C 5/008; G07C 5/0808; G07C 5/0816
See application file for complete search history.

(56) References Cited

U.S. PATENT DOCUMENTS

| | | | |
|---|---|---|---|
| 11,562,662 B1* | 1/2023 | Hall | G09B 9/165 |
| 2018/0137219 A1* | 5/2018 | Goldfarb | G06N 3/126 |

(Continued)

OTHER PUBLICATIONS

Jiang et al., "Performance Prediction of the Centrifugal Compressor Based on a Limited Number of Sample Data", Mathematical Problems in Engineering (2019).

(Continued)

*Primary Examiner* — Michael D Lang
(74) *Attorney, Agent, or Firm* — Yee & Associates, P.C.

(57) ABSTRACT

Example implementations relate to predicting the health of an aircraft component based on a hybrid digital twin. A computing system receives nominal operational data and operational data from aircraft sensors based on flights by an aircraft to evaluate an aircraft component on the aircraft. The computing system can estimate first parameters corresponding to the aircraft component based on a nominal digital twin using the nominal operational data outside respective alerts corresponding to the aircraft component and second parameters corresponding to the aircraft component based on an operational digital twin using the operational data. The computing system then estimates a first health parameter and a second health parameter for the aircraft component based on the first parameters and the second parameters, respectively. The computing system performs a comparison between the first health parameter and the second health parameter in order to provide a value for the aircraft component that represents the health of the aircraft component.

20 Claims, 8 Drawing Sheets

(56) References Cited

U.S. PATENT DOCUMENTS

2018/0297718 A1* 10/2018 Adibhatla .......... G05B 23/0243
2023/0418280 A1* 12/2023 Emery ............... G05B 23/0283

OTHER PUBLICATIONS

Ravi et al., "Compressor map prediction tool", IOP Conf. Series: Materials Science and Engineering 90 (2015).
Chu et al., "Rapid Modeling Method for Performance Prediction of Centrifugal Compressor Based on Model Migration and SVM", Digital Object Identifier (2017).

* cited by examiner

METHODS AND SYSTEMS FOR HYBRID DIGITAL TWIN DRIVEN HEALTH PREDICTIONS

FIELD

The present disclosure relates generally to predicting the health of components and systems, and more particularly to using a hybrid digital twin to predict the health of aircraft heat exchangers and other systems.

BACKGROUND

An aircraft environment control system (ECS) is a complex and critical system that ensures a comfortable and safe environment for passengers and crew throughout the flight by controlling the temperature, humidity, pressurization, and air circulation inside the cabin of the aircraft. For instance, the ECS may maintain a comfortable in flight temperature range of 18-24 degrees Celsius and a relative humidity of 20-60 percent throughout the cabin, despite the harsh external conditions of the atmosphere. The ECS also filters and circulates the air, thereby removing contaminants and replenishing oxygen levels to ensure that the air quality remains fresh and safe.

The ECS typically consists of several subsystems that work together to maintain a comfortable cabin environment. These subsystems include the air conditioning system, the cabin pressurization system, the ventilation system, and the air distribution system. In general, the air conditioning system cools or heats the air depending on the temperature requirements, while the pressurization system regulates the air pressure inside the cabin to a safe level. The ventilation system supplies fresh air to the cabin and removes stale air, while the air distribution system directs the air to specific areas of the cabin, such as the overhead vents, floor vents, and individual passenger vents. Together, these subsystems ensure that passengers and crew are comfortable and safe throughout the flight.

A heat exchanger is a crucial component of the ECS that plays a significant role in regulating the temperature of the air supplied to the cabin of the aircraft. The heat exchanger works by transferring heat between two fluids, typically the hot bleed air from the engines and the cooler air from the cabin. The bleed air is compressed, heated, and then passed through the heat exchanger, where it then transfers its heat to the cooler cabin air. The heat transfer process cools the bleed air and heats the cabin air, which can result in a comfortable in flight temperature for passengers and crew. In some cases, the heat exchanger in the ECS has a fin-and-tube design that consists of a series of small tubes with fins attached to increase the surface area of the tubes, which allows for greater heat transfer between the fluids. As the hot bleed air passes through the tubes, it heats the fins, which transfers the heat to the cooler cabin air. The cooled bleed air is then sent back to the air conditioning system, where it is compressed and heated again to maintain a constant supply of air to the cabin. As such, the heat exchanger is an essential component of the ECS that ensures the temperature inside the cabin remains comfortable and consistent throughout the flight.

Due partially to high usage, a heat exchanger can experience several issues that can affect its performance and compromise the overall effectiveness of the ECS. In some cases, the heat exchanger can become fouled with debris, such as dust, dirt, and other contaminants, which can reduce its efficiency and heat transfer capacity. The heat exchanger can also experience corrosion due to the high-temperature and high-pressure environment it operates in, which can lead to leaks and reduced efficiency. In some instances, the heat exchanger may suffer from mechanical damage, such as cracks or leaks, due to vibration, impacts, or other physical stresses. The heat exchanger can also develop ice on its surface due to the high altitude and low temperature environment, which can lead to reduced airflow and heat transfer capacity. In addition, the flow of air through the heat exchanger can become imbalanced, causing uneven heat transfer and reduced efficiency. For these reasons and other potential sources causing impaired performance, it is important to perform regular maintenance and inspections of the heat exchanger to prevent these issues and others in order to ensure that the ECS operates effectively and efficiently.

Maintaining the heat exchanger in an ECS, however, can be challenging due to the harsh operating environment, complex design, and safety considerations. The heat exchanger is often located in hard-to-reach areas of an aircraft, such as inside the wings or fuselage, which can make it difficult for technicians to access and inspect. In addition, because the heat exchanger operates at high temperatures and pressures, maintenance technicians might need to follow proper safety measures to prevent injuries, including allowing components to cool off prior to inspection. This can delay use of the aircraft in order to provide enough time for inspection. The complexity of the heat exchanger and cost of maintenance are also potential obstacles that might reduce the frequency that maintenance is performed.

Additionally, analysis of sensor data measured directly across the heat exchanger might not depict the degradation effectively or accurately in some cases. In particular, evaluation of the heat exchanger may lack critical information that can bolster the accuracy of the evaluation. For instance, there might not be an adequate number of sensors providing useful measurements of the heat exchanger; and effective evaluation might require estimation of one or multiple unknown health-related parameters, such as the heat transfer coefficient that cannot be measured directly by a sensor or sensors. As such, purely a data driven solution of heat-exchanger for an aircraft air-conditioning pack is also challenging as failure data may be inadequate to train a model that can be used for monitoring and maintaining the safety-critical aircraft system.

SUMMARY

In one example, a method for predicting a health of an aircraft component based on a hybrid digital twin is disclosed. The method involves receiving, at a computing system, nominal operational data from at least one aircraft sensor based on respective alerts corresponding to the aircraft component during a plurality of flights by an aircraft. The aircraft component is coupled to the aircraft. The method further involves estimating, by the computing system and based on a nominal digital twin using the nominal operational data, first parameters corresponding to the aircraft component and receiving, at the computing system, operational data from the at least one aircraft sensor based on the plurality of flights by the aircraft. The nominal digital twin uses portions of the nominal operational data outside the respective alerts corresponding to the aircraft component to estimate the first parameters corresponding to the aircraft component. The method also involves estimating, by the computing system and based on an operational digital twin using the operational data, second parameters corresponding to the aircraft component and estimating a first health parameter for the aircraft component based on the first parameters and a second health parameter for the aircraft component based on the second parameters. The method further involves performing, by the computing system, a comparison between the first health parameter and the second health parameter and providing a value for the aircraft component based on the comparison between the first health parameter and the second health parameter. The value represents the health of the aircraft component.

In another example, a system for predicting a health of an aircraft component based on a hybrid digital twin. The system includes an aircraft having at least one aircraft sensor and the aircraft component and a computing system. The computing system is configured to receive nominal operational data from the at least one aircraft sensor based on respective alerts corresponding to the aircraft component during a plurality of flights by the aircraft, and estimate, based on a nominal digital twin using the nominal operational data, first parameters corresponding to the aircraft component. The nominal digital twin uses portions of the nominal operational data outside the respective alerts corresponding to the aircraft component to estimate the first parameters corresponding to the aircraft component. The computing system is further configured to receive operational data from the at least one aircraft sensor based on the plurality of flights by the aircraft. The computing system is further configured to estimate, based on an operational digital twin using the operational data, second parameters corresponding to the aircraft component and estimate a first health parameter for the aircraft component based on the first parameters and a second health parameter for the aircraft component based on the second parameters. The computing system is also configured to perform a comparison between the first health parameter and the second health parameter, and provide a value for the aircraft component based on the comparison between the first health parameter and the second health parameter. The value represents the health of the aircraft component.

In an additional example, a non-transitory computer-readable medium is described. The non-transitory computer-readable medium is configured to store instructions, that when executed by one or more processors, cause a computing system to perform one or more of the functions of the above method.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
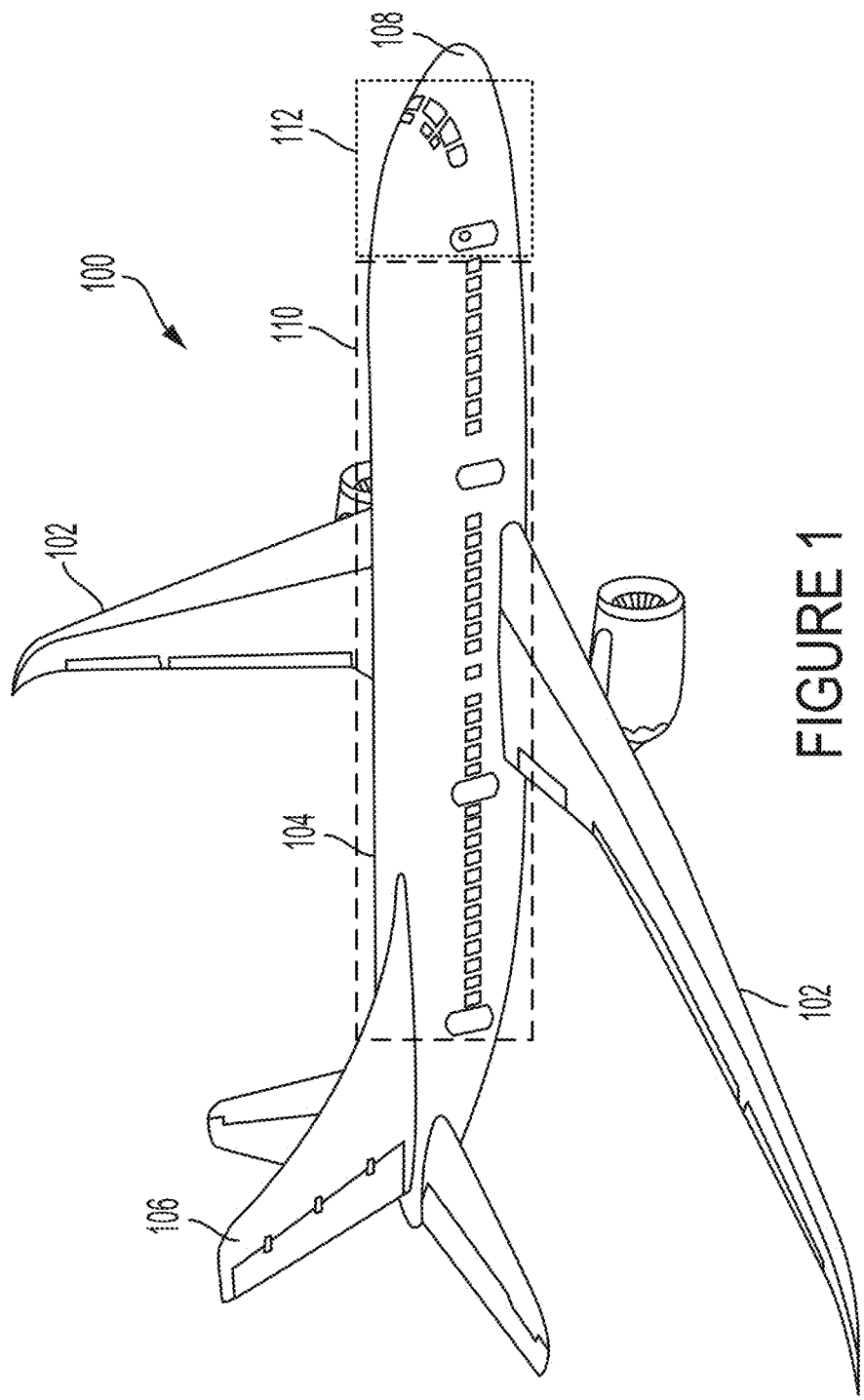
FIG. 1 illustrates a perspective view of an aircraft, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Example embodiments presented herein relate to techniques for making hybrid digital twin driven health predictions for various types of components and systems, such as health predictions for heat exchangers that operate as part of an aircraft's ECS. In general, a hybrid digital twin involves both a physics-based digital model, designed to provide an optimal output value or values representing the health for a component, system, or process, and an operational digital model, designed to use sensor measurements in order to provide a current health output value or values for the same component, system, or process. The output(s) representing health of the component as provided by the operational digital model can be compared to the nominal output value(s) representing the health of the component as produced by the physics-based model, which enables deviation to be detected and analyzed. In practice, deviation of the output(s) from the operational digital model with respect to the nominal output value(s) produced by the physics-based model may indicate that the analyzed component, system, or process is operating sub-optimally and may require some form of further evaluation or maintenance. Although some implementations described herein relate to using a hybrid digital twin to analyze and evaluate the performance (e.g., the health) of aircraft heat exchangers, disclosed techniques can be used to evaluate performance and health of various types of systems, components, and processes, including other aircraft systems and non-aircraft systems.

By way of an example, a hybrid digital twin can be generated and used to evaluate performance of one or more heat exchangers. In the example, the approach consists of two hybrid digital twins models: a nominal digital twin and an operational digital twin model. The data involved in calibration of the parameters of the component model/equations varies across the nominal digital twin model and the operational digital twin model. The nominal digital twin is calibrated using nominal data, which allows parameters to be estimated from purely nominal historic data. The operational digital twin is calibrated using operational sensor data, which may include degraded information for the component. As such, hybrid digital twin represents the terminology used herein regarding the approach of combining first principle physics-based models of the aircraft systems/subsystems/components with sensor data associated with it, for model calibration (e.g., estimation of parameters) using advanced analytics.

Disclosed techniques use a hybrid digital twin to estimate health parameters for a heat exchanger or another type of component, system, or subsystem. Purely nominal data can be used to establish the nominal health related parameter for the heat exchanger as a baseline. Comparison of the nominal health related parameter with estimated parameter from operational data (which may include detected degraded values for the heat exchanger) is tracked to predict degradation. As such, model calibration library and parameter estimation represents an integral part of hybrid digital twin based prognostics solutions.

The hybrid digital twin can be used to evaluate the performance of one or multiple heat exchangers on one or multiple aircraft by enabling comparisons of the output values and/or trends generated by the nominal digital twin model and the operational digital twin model. In some cases, when a difference between the outputs is detected, the difference can indicate the heat exchanger is experiencing some form of degradation, thereby enabling technicians to determine when to perform maintenance on the heat exchanger. In some instances, the degree of difference represents how much degradation that a heat exchanger is currently experiencing and can be further evaluated relative to historical trends to determine the maintenance actions that should be performed. As such, disclosed techniques can involve generating and using hybrid digital twins to evaluate health of various types of components and systems, which can increase the ability to monitor and predict when the components or systems require some form of maintenance or replacement.

In some examples, disclosed techniques involve the initial generation of a hybrid digital twin based on a system, component, or process based on an accumulation of sensor data and/or simulations of the system, component, or process in various conditions. This way, the hybrid digital twin can be trained and subsequently used to evaluate the health of the system, component, or process. In the example, the approach consists of two hybrid digital twins models: a nominal digital twin and an operational digital twin model. In general, the physics-based digital twin model is a type of mathematical model based on fundamental principles of physics that uses mathematical equations and physical laws to describe the behavior of a physical system, component, or process. As such, physics-based models can be used to predict the behavior of a system (component) under different conditions, or to design and optimize physical systems and can be used to simulate a wide range of physical phenomena, such as the motion of objects, fluid flow, electromagnetic fields, and thermodynamics.

The operational digital twin model represents a virtual replica of the physical component, system, or process, and can be used to simulate and optimize its performance in real-time. In practice, the operational digital twin model is designed to be integrated with the actual system, component, or process and provide real-time data and insights into its behavior, and can be created using data from sensors (e.g., aircraft sensors) and other sources. This replica can be used to simulate the performance of the physical system under different conditions, and to identify potential problems or opportunities for improvement. As such, operational twin outputs/estimated health related parameters are compared with pre-estimated nominal health related parameter output to predict degradation or other performance parameters. As such, the operational digital twin model can beneficially allow a reduction in downtime and increase efficiency by providing real-time data and insights into the performance of one or more systems.

In some embodiments, disclosed techniques are used to provide accurate estimation of unmeasured parameters related to a component or system in order to monitor and potentially predict the health of the component or system. In particular, the hybrid digital twin and efficient model calibration can enable accurate predictions of the unmeasured parameters, which may lack sensors that can accurately provide measurements for these parameters. For instance, a hybrid digital twin model can be used to estimate both a nominal heat transfer coefficient and an operational heat transfer coefficient for one or multiple heat exchangers located onboard an aircraft despite a lack of sensors that can measure the heat transfer coefficient. Rather, the digital twin models are able to use work around strategies for missing design parameter data in order to estimate the unmeasured parameter(s), which allows for online estimation even in adverse conditions and allows for alerts and other information (e.g., audiovisual alerts) to be provided to technicians. After generation of the hybrid digital twin, a computing system that is located onboard or remote from the aircraft may use a health prediction algorithm to analyze the tracked parameters output by the hybrid digital twin and raise alerts in cases when the analyzed component or system (e.g., the heat exchanger) is found to be operating outside normal operational values, which may signal some form of degradation. As an example result, the computing system can leverage the hybrid digital twin to predict and detect health issues prior to occurrence, which can increase safety and reliability of the measured components and systems despite less sensor data being available for evaluating these components and systems.

An example method for analyzing the health of an aircraft heat exchanger can involve a computing system initially identifying the nominal regions (also referred to herein as nominal windows) along a historical timeline representative of multiple flights performed by an aircraft (or along the historical timelines associated with the flights performed by multiple aircraft). The computing system may also identify windows of flight based on a specific tail, which can be based on maintenance messages and features extracted from sensor data provided by sensors onboard the aircraft. For instance, the computing system may obtain sensor measurements during legs of flights when warnings or maintenance messages for the heat exchanger occurred. The computing system may then estimate health related parameters for the heat exchanger using a hybrid digital twin and establish the nominal operational range of the health related parameters for the heat exchanger as a baseline.

In some cases, the computing system or another computing device may generate the hybrid digital twin based on the obtained data associated with the flight windows. In other cases, the hybrid digital twin may be obtained and used by the computing system by providing information from the identified flight windows as inputs into the already generated digital twin models. As such, the computing system may estimate the heat transfer coefficient using the nominal digital twin and the health-related parameters. For instance, a nominal operational range for the heat transfer coefficient for the heat exchanger can then be generated over selected flight windows of historical operational data. The computing system may then detect heat exchanger degradation and failure prognostics based on sensor data, estimating an operational heat transfer coefficient, and with reference to the baseline nominal heat transfer coefficient.

In some cases, the heat transfer coefficient for the heat exchange can be estimated using nominal operational data. The nominal value of the heat transfer coefficient can then be characterized by the mean sigma (e.g., plus or minus 3 sigma) for a number of flights by the aircraft (or multiple aircraft), which may be performed using both high frequency (e.g., 1 Hertz) and low frequency (e.g., ACMS single point snapshot) sensor data for multiple flights. In some instances, estimation accuracy can be tracked by root mean square (RMS) value and may be observed below 0.5 (e.g., <1%) for entire nominal range. As such, heat exchanger degradation may be successfully predicted before the related maintenance messages are triggered in some cases by tracking the deviation of the heat transfer coefficient from the nominal heat transfer coefficient value, which can be detected based on the sudden increase in the RMS value of the error for estimation in some cases. In addition, in some examples, the computing system can iteratively calibrate the physics based model can be performed using a nonlinear least square estimation technique and/or Meta heuristic techniques, such as particle swarm optimization (PSO).

In some examples, a computing system may use disclosed techniques to generate part number and tail-specific solutions, enabling the solution to have a higher level of accuracy as compared to solutions developed for generic cases. In addition, the hybrid technique leverages both underlying physics of aircraft sub-systems and flight data, making it a high-fidelity model. The computing system can estimate intrinsic health parameters that are otherwise not directly evident from flight sensor data. Disclosed techniques leverage metaheuristic algorithms like PSO that can work for generic parameter estimation case.

Referring now to the Figures, FIG. 1 illustrates a perspective view of an aircraft, according to an example implementation. The aircraft 100 is shown implemented with a set of wings 102, a fuselage 104, a tail 106, and a nose 108. In other embodiments, the aircraft 100 can have other configurations. In addition, FIG. 1 shows a position of a cabin 110 and a flight deck 112 of the aircraft 100. The cabin 110 and the flight deck 112, together collectively, make up the occupancy areas of the aircraft 100 where passengers and crew may occupy during flight. In particular, passengers may sit within the cabin 110 while pilots operate the aircraft from within the flight deck 112. The cabin 110 and the flight deck 112 may be separated by a cockpit door and may receive air supply from one or more of the same air sources, such as a set of air-conditioning packs.

The aircraft 100 may include various subsystems or components that work together to ensure safe and efficient flight. For instance, the aircraft 100 includes an electrical system, which provides electrical power to the aircraft and can include generators, batteries, wiring, and various other electrical components. The aircraft 100 also includes a hydraulic system to power various components, such as landing gear, flaps, and brakes, and a fuel system to store and distribute fuel to the engines. The aircraft 100 further includes a navigation system that enables navigation and communication with air traffic control, a communication system to enable communication with other aircraft and the ground, and a flight control system to control the movement of the aircraft 100. In addition, the aircraft 100 also includes an ECS to maintain a comfortable environment for passengers and crew by regulating temperature, humidity, and air quality. The aircraft also includes a landing gear system, an avionics system, and other systems.

In some examples, onboard computing systems and/or remote computing systems may perform disclosed techniques to evaluate the performance and health of various systems and components located onboard the aircraft 100.

Figure 2:
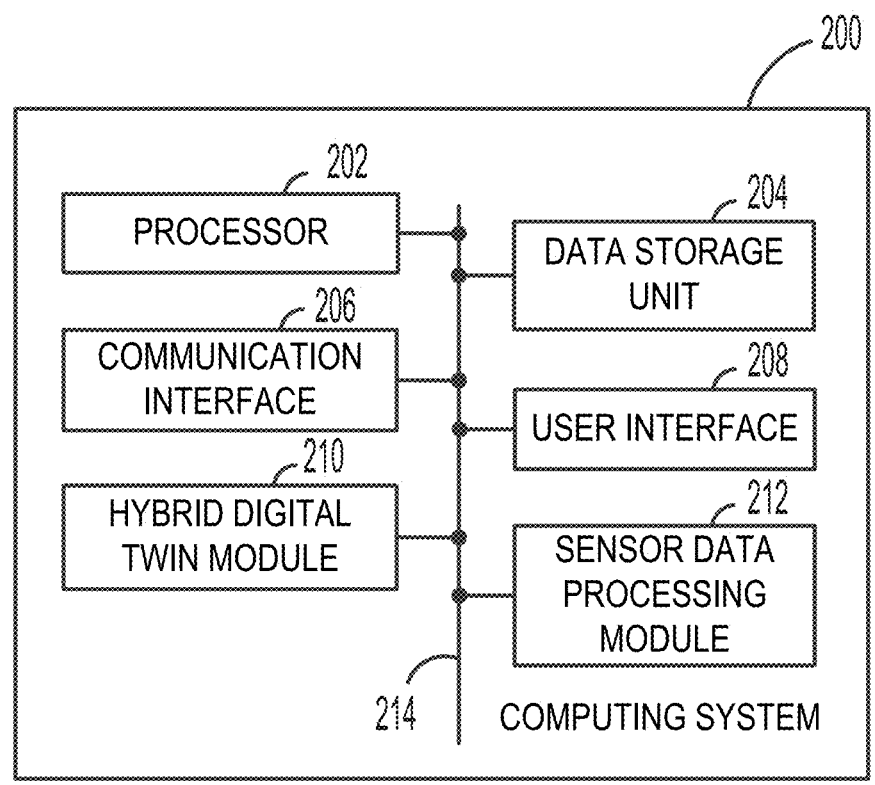
FIG. 2 is a block diagram of a computing system, according to an example implementation.

FIG. 2 is a block diagram of a computing system, according to an example implementation. The computing system 200 may perform various acts and/or functions, such as those described in this disclosure. For instance, the computing system 200 may evaluate the health of various components or systems on the aircraft 100 shown in FIG. 1. The computing system 200 may include various components, such as a processor 202, a data storage unit 204, a communication interface 206, a user interface 208, a hybrid digital twin module 210, and a sensor data processing module 212. The components can be connected to each other (or to another device, system, or other entity) via a connection mechanism 214, and can include more or fewer components in other example implementations. In other embodiments, the computing system 200 may be implemented across multiple computing devices operating within a network. In other examples, a different control mechanism may perform operations related to predicting health of components using a hybrid digital twin.

In addition, the computing system 200 can be located onboard an aircraft (e.g., the aircraft 100 shown in FIG. 1) or remotely from the aircraft or a combination of onboard and remote computing systems. For instance, the computing system 200 can acquire data using onboard sensors and computing systems and remote computing systems can use the twin modules to process sensor data received from the onboard computing systems. The remote system or systems may use the sensor data to do off-board analytics using estimated health related parameters from the hybrid digital twin module 210.

In this disclosure, the term "connection mechanism" means a mechanism that facilitates communication between two or more devices, systems, or other entities. For instance, a connection mechanism can be a simple mechanism, such as a cable or system bus, or a relatively complex mechanism, such as a packet-based communication network (e.g., the Internet). In some instances, a connection mechanism can include a non-tangible medium (e.g., where the connection is wireless).

The processor 202 may represent one or more general-purpose processors (e.g., a microprocessor) and/or one or more special-purpose processors (e.g., a digital signal processor (DSP)). As such, the processor 202 may include a combination of processors. The processor 202 may perform operations, including the processing of data received from the other components within the computing system 200 and of data obtained from external sources, such as sensors (e.g., aircraft sensors) and/or simulation engines.

The data storage unit 204 may include one or more volatile, non-volatile, removable, and/or non-removable storage components, such as magnetic, optical, or flash storage, and/or can be integrated in whole or in part with the processor 202. As such, the data storage unit 204 may take the form of a non-transitory computer readable medium, having stored therein instructions executable (e.g., compiled or non-compiled program logic and/or machine code) that, when executed by the processor 202, cause the computing system 200 to perform one or more acts and/or functions, such as those described in this disclosure. Such program instructions can define and/or be part of a discrete software application. In some instances, the computing system 200 can execute program instructions in response to receiving an input, such as from the communication interface 206 or the user interface 208. The data storage unit 204 may also store other types of data, such as those types described in this disclosure.

In some examples, the data storage unit 204 may serve as a local storage for information obtained from one or more external sources. For example, the data storage unit 204 may store information obtained from sensors. The data storage unit 204 also can store instructions executable by the processor 202 to perform functions of the computing system 200. For example, any of the modules described herein may take the form of instructions executable by the processor 202 and the instructions can be stored on the data storage unit 204.

The communication interface 206 can allow the computing system 200 to connect to and/or to communicate with another entity (e.g., another computing device) according to one or more protocols. In an example, the communication interface 206 can be a wired interface, such as an Ethernet interface or a high-definition serial-digital-interface (HD-SDI). In another example, the communication interface 206 can be a wireless interface, such as a cellular or WI-FI interface. A connection can be a direct connection or an indirect connection, the latter being a connection that passes through and/or traverses one or more entities, such as a router, switcher, or other network device. Likewise, a transmission can be a direct transmission or an indirect transmission. The communication interface 206 may also utilize other types of wireless communication to enable communicating with one or more aircrafts and remote computing systems that can perform processing operations described herein.

The user interface 208 can enable one or more users (e.g., a pilot, crew) to interact with the computing system 200, including to enable input and analysis related to disclosed operations. For instance, the user interface 208 can provide alerts and/or other information related to the predicted health of heat exchangers and other components analyzed using hybrid digital twins as disclosed herein. The alerts can include audio, visual, tactile, and/or other types of alerts. In some instances, the alerts can include text, audio-based text, and/or other visualizations. As such, the user interface 208 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 208 can include hardware and/or software components that facilitate interaction between the computing system 200 and one or more users.

The hybrid digital twin module 210 represents a type of digital twin that combines both physical and virtual elements. The hybrid digital twin module 210 can provide a digital replica of a physical system, such as a factory, machine, component, or product, and integrate the digital replica with real-time data from sensors and other sources. The hybrid digital twin enables combination of both the physical and digital worlds through constructing models using physics, data, and advanced analytics, allowing for a more comprehensive view of the system or process being modeled. This allows engineers and operators to monitor and analyze the system in real-time, identify potential issues before they arise, and optimize performance.

In some examples, the hybrid digital twin module 210 consists of two hybrid digital twins models: a nominal digital twin and an operational digital twin model. The data involved in calibration of the parameters of the component model/equations varies across the nominal digital twin model and the operational digital twin model. The nominal digital twin is calibrated using nominal data, which allows parameters to be estimated from purely nominal historic data. The operational digital twin is calibrated using operational sensor data, which may include degraded information for the component. As such, hybrid digital twin represents the terminology used herein regarding the approach of combining first principle physics-based models of the aircraft systems/subsystems/components with sensor data associated with it, for model calibration (e.g., estimation of parameters) using advanced analytics.

As such, hybrid digital twins can be used in various industries, such as manufacturing, aerospace, and automotive, as they enable improved efficiency, reduced downtime, and better decision-making. In some embodiments, the hybrid digital twin module 210 is used to evaluate heat exchangers on one or multiple aircraft. The hybrid digital twin module 210 can be used to predict the health of other aircraft components or systems. In addition, the hybrid digital twin module 210 can be used to predict the health of other types of systems and components in some cases.

The sensor data processing module 212 represents a component of the computing system 200 that may be used to obtain and analyze sensor data from sensors measuring aspects of the aircraft. For instance, the sensor data processing module 212 may use measurements from different types of sensors and can monitor trends within sensor measurements.

In some examples, the computing system 200 can use the hybrid digital twin module 210 to evaluate the health of one or multiple components, such as a heat exchanger on an aircraft, by creating a digital replica of the heat exchanger and integrating it with real-time data from sensors via the sensor data processing module 212. The computing system 200 or another computing system may initially build a digital twin, which can involve developing a digital twin of the heat exchanger that accurately represents its physical structure, materials, and performance characteristics. As such, the computing system 200 can integrate the digital twin with real-time data. For instance, sensors on the physical heat exchanger can collect real-time data on its operating conditions, such as temperature, pressure, and fluid flow. The collected data is then integrated with the digital twin in real-time.

The computing system 200 can monitor the performance of the heat exchanger (or other systems) using the hybrid digital twin and analyze the sensor data to detect any deviations from normal operating conditions, such as changes in temperature or flow rates. In some instances, the computing system may use the hybrid digital twin to evaluate a nominal heat coefficient and an operational heat coefficient, both of which may be estimated based on the models within the hybrid digital twin. As such, monitoring for deviations from normal operating conditions can help identify potential issues before they become critical enough so as to impact the aircraft's operation. In addition, the computing system 200 can use the hybrid digital twin module 210 to predict when maintenance might be required on the heat exchanger. By analyzing the data over time, the computing system 200 can identify patterns and predict when maintenance is needed, rather than waiting for a failure to occur. As such, a hybrid digital twin can beneficially provide a more comprehensive and accurate view of the heat exchanger's health, enabling operators and maintenance personnel to beneficially make more informed decisions about maintenance, repair, and replacement.

Figure 3:
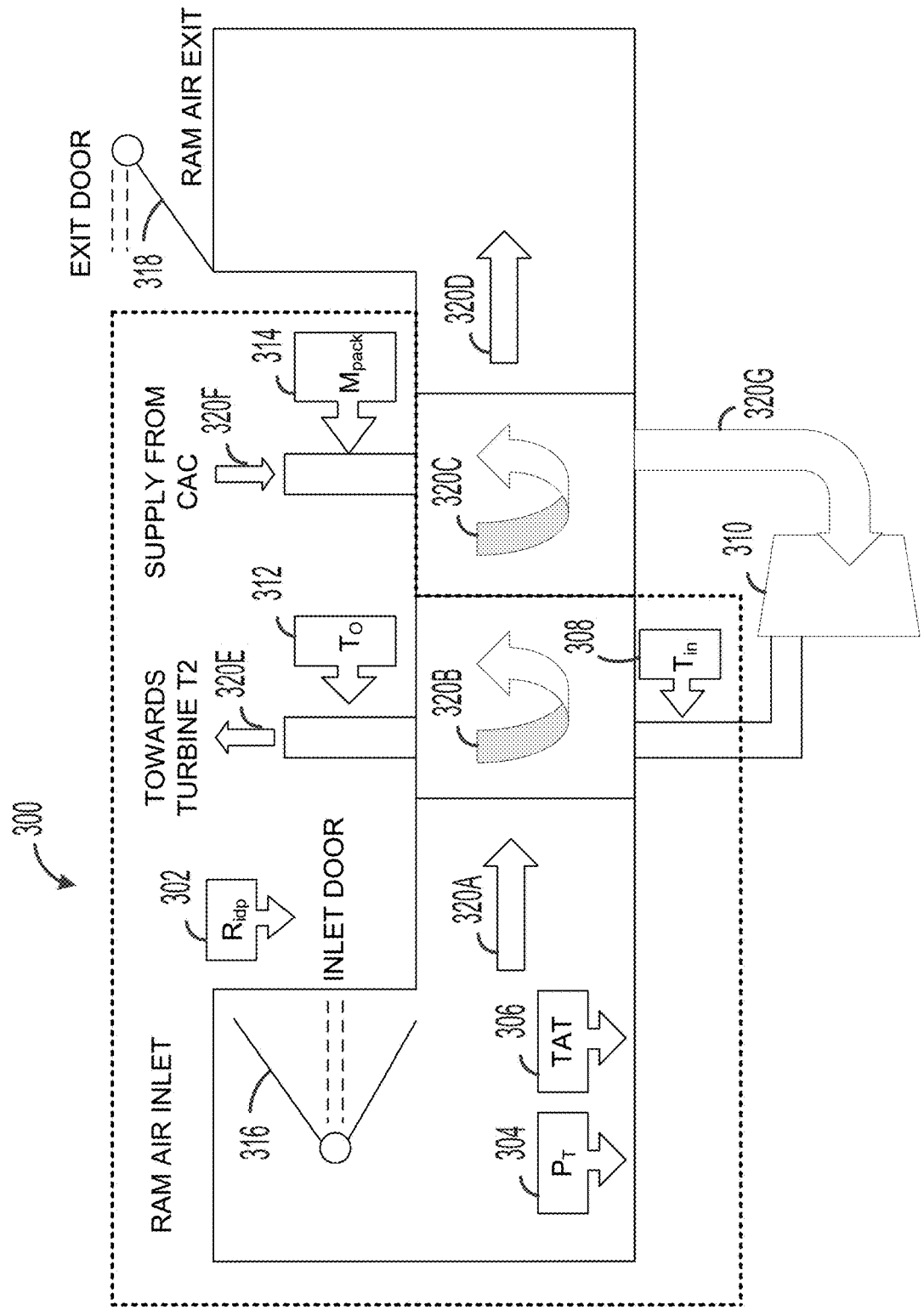
FIG. 3 depicts a representation of a ram air and heat exchanger subsystem, according to an example implementation.

FIG. 3 depicts a representation of a ram air and heat exchanger subsystem 300, according to an example implementation. The subsystem 300 may be used in aircraft and other high-speed vehicles to provide cooled air to the cabin or engine, as well as to cool engine oil or other fluids. As shown in FIG. 3, the subsystem 300 includes ram air duct inlet door position ($R_{idp}$) 302, total air pressure ($P_T$) 304, total air temperature (TAT) 306, Inlet Temperature ($T_{in}$) 308, air cycle machine (ACM) compressor 310, Exit Temperature ($T_O$) 312, Pack mass flow rate ($M_{pack}$) 314, inlet door 316, and exit door 318. In addition, some of the air flow through the subsystem 300 is represented by arrows 320A, 320B, 320C, 320D, 320E, 320F, 320G. It is understood by those skilled in the art that other aspects of the subsystem 300 may be present despite not being shown in FIG. 3.

The ram air part of the subsystem 300 uses the high-speed airflow created by the motion of the aircraft through the air to collect outside air and force it into the subsystem 300. This air is then cooled as it passes through the heat exchanger component, which is typically a series of tubes or fins that allow heat to be transferred from the air to a coolant fluid, such as water or oil. The cooled air can then be used to provide fresh air to the cabin or to cool the engine, while the heated coolant fluid is circulated back to the engine or other components to dissipate the heat. As such, the subsystem 300 allows for efficient cooling of critical components and provides a comfortable environment for passengers or crew.

Operating equations for the heat exchanger thermal dynamics can be represented as follows:

$$T_{ho}^* = \frac{W_h(T_{hi} - T_{ho})}{m_h} - \frac{H_h(T_{ho} - T_{co})}{m_h C_h} \quad [1]$$

$$T_{co}^* = \frac{W_{ram}(T_{ci} - T_{co})}{m_c} - \frac{H_c(T_{co} - T_{ho})}{m_c C_c} \quad [2]$$

where $T_{hi}$ and $T_{ci}$ represent, respectively, inlet temperatures for hot side and cold side, $T_{ho}$ and $T_{co}$ represent, respectively, outlet temperatures for hot side and cold side, $W_h$ represents the hot side mass flow rate (pack flow rate), $W_{ram}$ represents the ram air duct mass flow rate, $H_h$ and $H_c$ represent, respectively, the hot side heat transfer coefficient and the cold side heat transfer coefficient, $m_h$ and $m_c$ represent, respectively, mass flows corresponding to the hot side and the cold side, and $C_h$ and $C_c$ represent, respectively, specific heats for the hot side and the cold side. Mass flow ($m_h$ and $m_c$) are the products of density and volume for the hot side and the cold side. As shown above in equation 1 and equation 2, analysis of a heat exchanger may call for the estimation of unknown health related parameters (e.g., an operational value and a nominal value for the heat transfer coefficient) to develop a solution that satisfies observability conditions.

The heat transfer coefficient of a heat exchanger represents a measure of the rate at which heat is transferred between the fluid flowing through the heat exchanger and the surface of the heat exchanger. As such, the heat transfer coefficient can be defined as the amount of heat transferred per unit area per unit time per unit temperature difference between the fluid and the surface, and can depend on several factors, including, by way of non-limiting example, the properties of the fluid, the geometry of the heat exchanger, and the flow rate of the fluid. For instance, a high heat transfer coefficient indicates efficient heat transfer, while a low heat transfer coefficient indicates inefficient heat transfer. Because the heat transfer coefficient can indicate information regarding the current performance of the heat exchanger, disclosed techniques may involve estimating and comparing an operational heat transfer coefficient and a nominal heat transfer coefficient in order to detect degradation at the heat exchanger.

Figure 4:
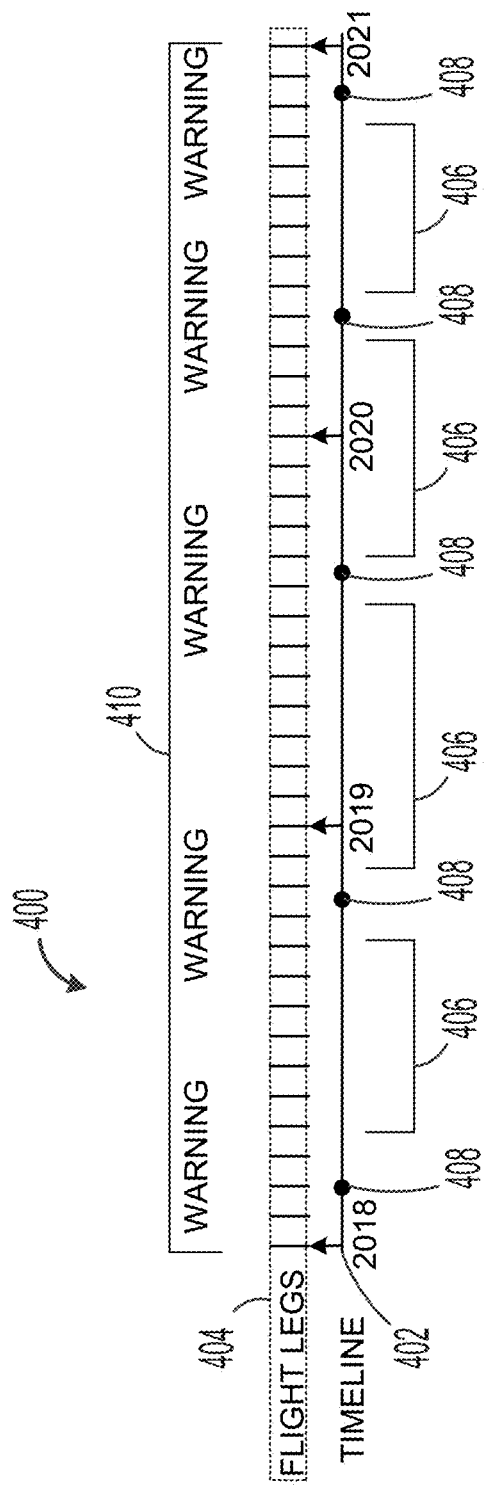
FIG. 4 depicts a historical timeline of flight data with windows of nominal data, according to an example implementation.

FIG. 4 depicts a historical timeline of flight data with windows of nominal data, according to an example implementation. The representation 400 illustrated in FIG. 4 includes a historical timeline 402, flight legs 404, nominal windows 406, warnings 408, and warning window 410 to provide a visual illustration that conveys aspects of how a computing system may perform disclosed techniques to predict the health of one or multiple components on an aircraft in accordance with the representation 400.

In general, a computing system may analyze information obtained during flights performed by an aircraft. For instance, the computing system may receive sensor data from one or multiple onboard aircraft sensors. In practice, the computing system may identify nominal windows 406 along the historical timeline 402 where a component or system (e.g., a heat exchanger) performed without any anomalies detected within sensor data. For instance, the computing system may evaluate the historical timeline 402 for a specific tail, which can be based on maintenance messages and extracted features from the sensor data. The computing system can then obtain sensor data during the nominal windows 406. For instance, the computing system may download Aircraft Condition Monitoring System (ACMS) snapshot data for flight legs 404 that occur during the nominal windows 406. In some examples, the computing system may provide the nominal operational data into a nominal operational database. The computing system may also obtain nominal operational data from a nominal operational database, which may represent nominal operational data from multiple aircraft in some cases. These aircraft may share some similarities, such as the same model, used for the similar flights, etc.

The computing system may tail specific data in order to perform parameter estimation using a nominal digital twin. The nominal digital twin can be modeled based on nominal operational data. The computing system may then estimate a nominal heat transfer coefficient for the heat exchanger of the aircraft. For instance, the nominal hybrid digital twin model can be used to estimate health related parameters (e.g., heat transfer coefficient) and establish the nominal operational range of the heat transfer coefficient for the heat exchanger as a baseline. The nominal operational range for the heat transfer coefficient can be generated over selected windows (e.g., the nominal windows 406) of historical operational data for a specific tail. In some instances, the computing system propagates the heat transfer coefficient and estimated root-mean-square error (RMSE) over flights by aircraft.

The computing system can then perform detection of heat exchanger degradation and failure prognostics with reference to the baseline nominal heat transfer coefficient. For instance, the computing system may also obtain sensor data and information based on the warnings 408 that occur during flight legs 404. In some cases, the computing system may obtain data with replacements/warnings and may also obtain operational data that may or may not have warnings. The computing system may obtain sensor data and information based on warning windows 410 when one or multiple warnings 408 related to a particular component or system (e.g., a heat exchanger) occurred. The warning windows 410 can include maintenance messages and warnings 408 for the heat exchanger. In some examples, the computing system may download ACMS snapshot data for flight legs 404 within the warning windows 410.

The computing system may generate, provide data to, and/or receive sensor data from an off nominal (degraded) operational database. In some cases, the operational data may or may not include data that involves degradation. The computing system can tail specific data to estimate one or multiple parameters using an operational digital twin of the hybrid digital twin. The estimated parameters can be used to estimate the current heat transfer coefficient, which can be referred to herein as an operational heat transfer coefficient. In some instances, the computing system propagates the heat transfer coefficient and estimated RMSE over flights by aircraft. The computing system may then detect and/or anticipate degradation or failure using deviation from a nominal range for the component or system based on a comparison between the estimated nominal heat transfer coefficient and the estimated operational heat transfer coefficient determined based on the degraded operational data.

In some examples, the computing system estimates the heat transfer coefficient for a secondary heat exchanger for air conditioning pack. The computing system may use the digital twin modeled with operational data to estimate the heat transfer coefficient for the secondary heat exchanger. In some examples, the computing system may compare the heat transfer coefficients propagated for secondary heat exchangers (e.g., for the left and the right air-conditioning packs). Deviation in the heat transfer coefficients may indicate degradation at one of the heat exchangers. In some cases, the computing system may estimate drift in the heat exchanger of the related pack after the degraded heat exchanger is repaired or replaced.

Figure 5:
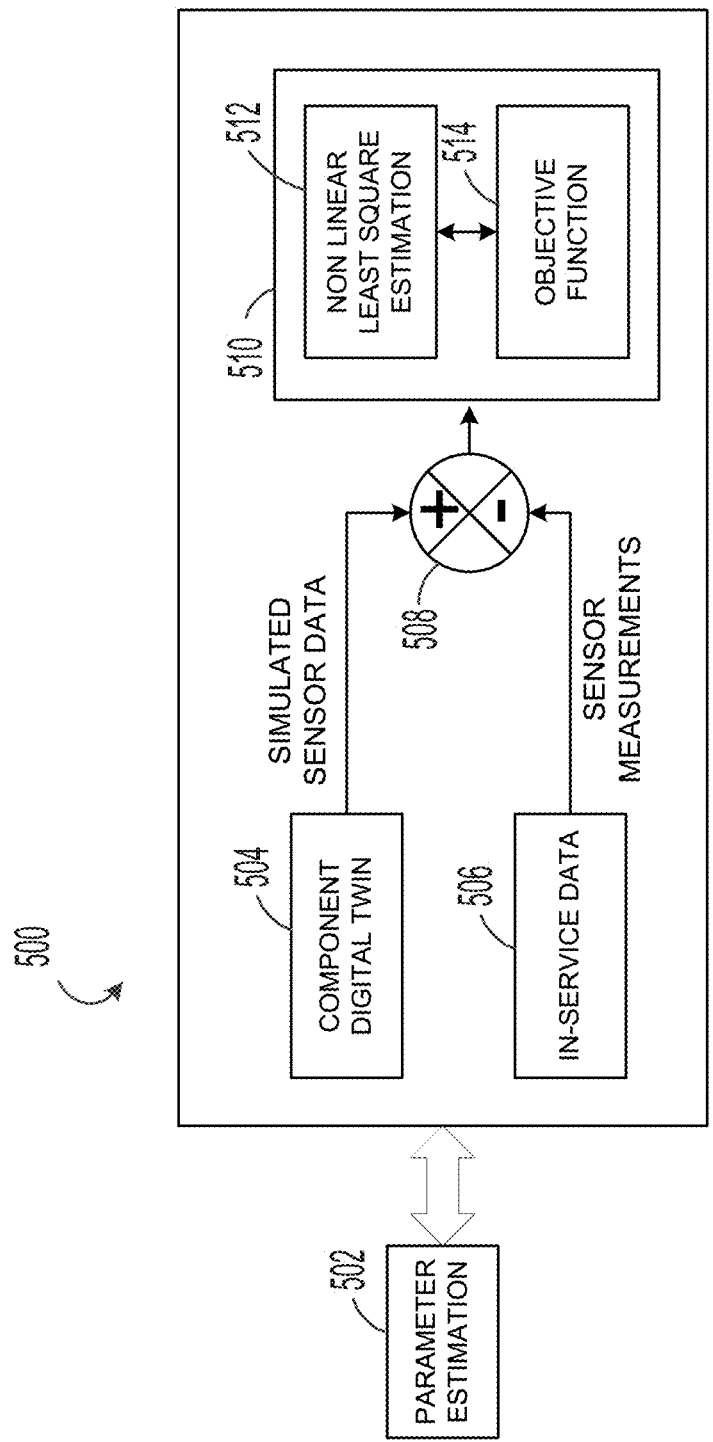
FIG. 5 depicts a parameter estimation and evaluation technique, according to an example implementation.

FIG. 5 depicts a parameter estimation and evaluation technique, according to an example implementation. The representation 500 includes parameter estimation 502, component digital twin 504, in-service data 506, combination module 508, and physics-based module 510. As shown, parameter estimation 502 can be provided and/or received based on a computing system performing operations related to the representation 500. The component digital twin 504 can provide simulated sensor data to combination module 508 while in-service data 506 can provide sensor measurements to combination module 508. The combination module 508 can provide combined information to the physics-based module 510 for evaluation and further parameter estimation.

In some examples, physics-based module 510 may involve calibration performed using nonlinear least square estimation 512 and an objective function 514, such as a Meta heuristic technique like particle swarm optimization (PSO). Nonlinear least squares estimation 512 represents a method used to estimate the parameters of a nonlinear mathematical model by minimizing the sum of the squares of the differences between the observed data and the predicted values from the model. The nonlinear model is typically defined by a set of nonlinear equations, and the parameters to be estimated are the coefficients of these equations. As such, the method works by iteratively adjusting the values of the parameters until the sum of the squared differences between the observed data and the predicted values is minimized. For instance, the process can involve initially defining the non-linear model and the parameters to be estimated, collecting observed data, and estimating the initial values of the parameters. The process can further involve using an iterative algorithm, such as the Gauss-Newton method or the Levenberg-Marquardt algorithm, to adjust the values of the parameters until the sum of the squared differences between the observed data and the predicted values is minimized. The process can then involve evaluating the goodness of fit of the estimated model by examining the residuals (i.e., the differences between the observed data and the predicted values) and repeating the process until a satisfactory level of accuracy is achieved.

PSO represents a type of stochastic optimization algorithm that can used to solve complex optimization problems by iteratively searching for the optimal solution by simulating the social behavior of particles moving in a search space. The algorithm simulates the behavior of a swarm of particles moving in a search space, and uses their movements to find the optimal solution to a given optimization problem. PSO can be customized by adjusting various parameters, such as the number of particles, the maximum velocity, and the weight coefficients. The effectiveness of PSO depends on the problem at hand and the choice of parameter settings.

In some examples, the computing system uses nonlinear least square estimation for parameter estimation. For instance, for the parameter estimation of a first flight, a set of initial values of parameters (within valid range) can be specified as an input. The parameter estimation for succeeding flight legs can use estimated value from a previous flight leg as an initial value, as shown in FIG. 6.

Figure 6:
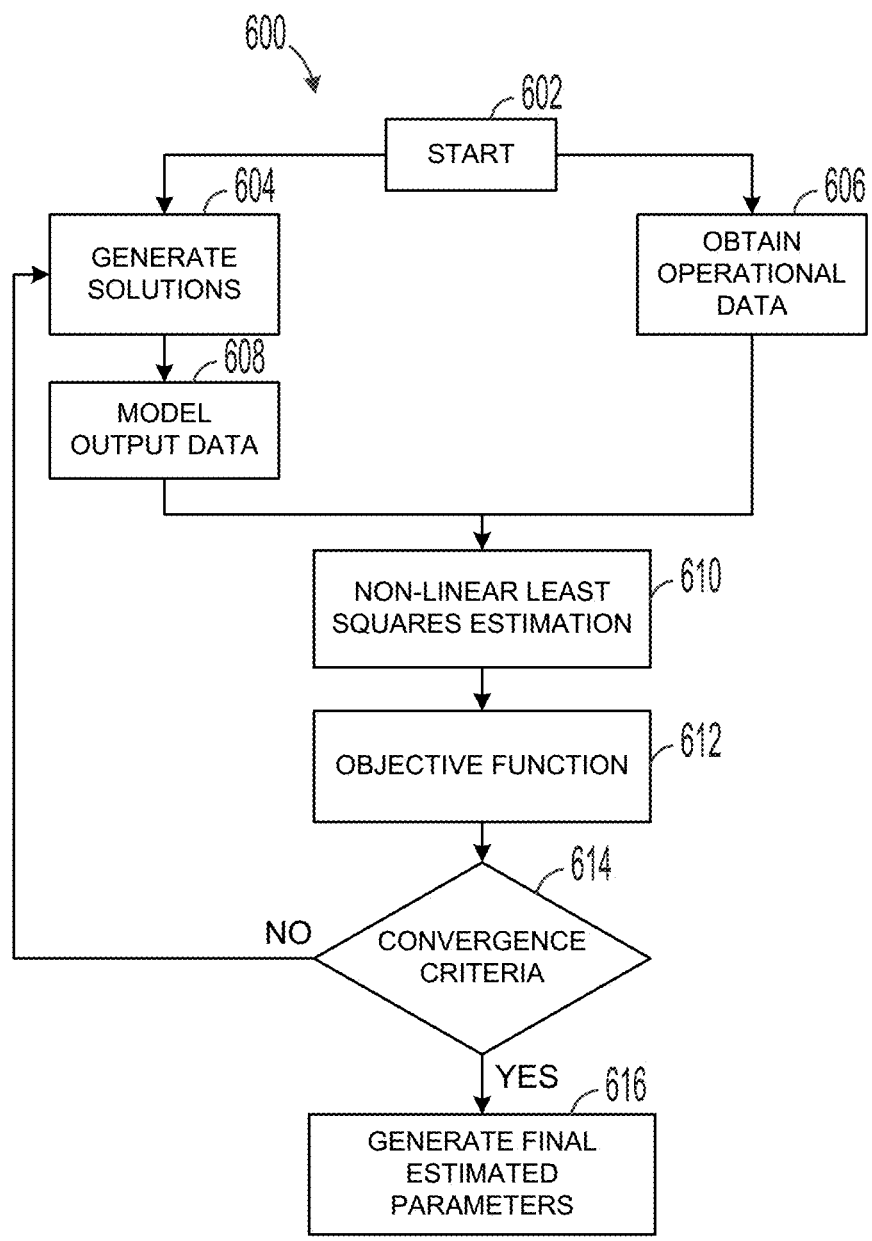
FIG. 6 shows a flowchart for parameter estimation technique, according to an example implementation.

FIG. 6 shows a flowchart for parameter estimation technique, according to an example implementation. The technique includes a start 602, which involves generating solutions 604 and obtaining operational data 606. From the generated solutions, a computing system can model output data 608 and use the output data 608 along with the operational data 606 to perform a non-linear least squares estimation 610. The computing system can evaluate the output from the non-linear least squares estimation 610 via an application of the objective function 612. The computing system can use convergence criteria 614 to evaluate the output from the objective function 612. If the output passes the convergence criteria 614, the computing system can generate final estimated parameters 616. If the output does not pass the convergence criteria 614, the technique 600 involves returning to generating solutions 604. Convergence criteria 614 can be used to ensure that the iterative algorithm produces a reliable and accurate solution within a reasonable number of iterations.

Convergence criteria 614 represent conditions that are used to determine when an iterative algorithm has converged to a solution. In other words, convergence criteria are used to assess whether the solution obtained by an iterative algorithm is sufficiently accurate and stable. There are different types of convergence criteria, which may include tolerance-based criteria that are based on the difference between the current and previous solution, and involve setting a tolerance value that determines when the solution is close enough to the desired accuracy. The algorithm continues iterating until the difference between the current and previous solution is less than the tolerance value. In some examples, convergence criteria 614 may involve residual-based criteria that represent the difference between the current solution and the exact solution. The algorithm continues iterating until the residual falls below a certain threshold value. In some implementations, convergence criteria 614 can involve using gradient-based criteria, which is based on the rate of change of the solution. The algorithm continues iterating until the gradient is close to zero. Other types of criteria can be used, such as based on the norm of the error or the solution, which is a measure of the magnitude of the error or the solution. The algorithm continues iterating until the norm falls below a certain threshold value.

Figure 7:
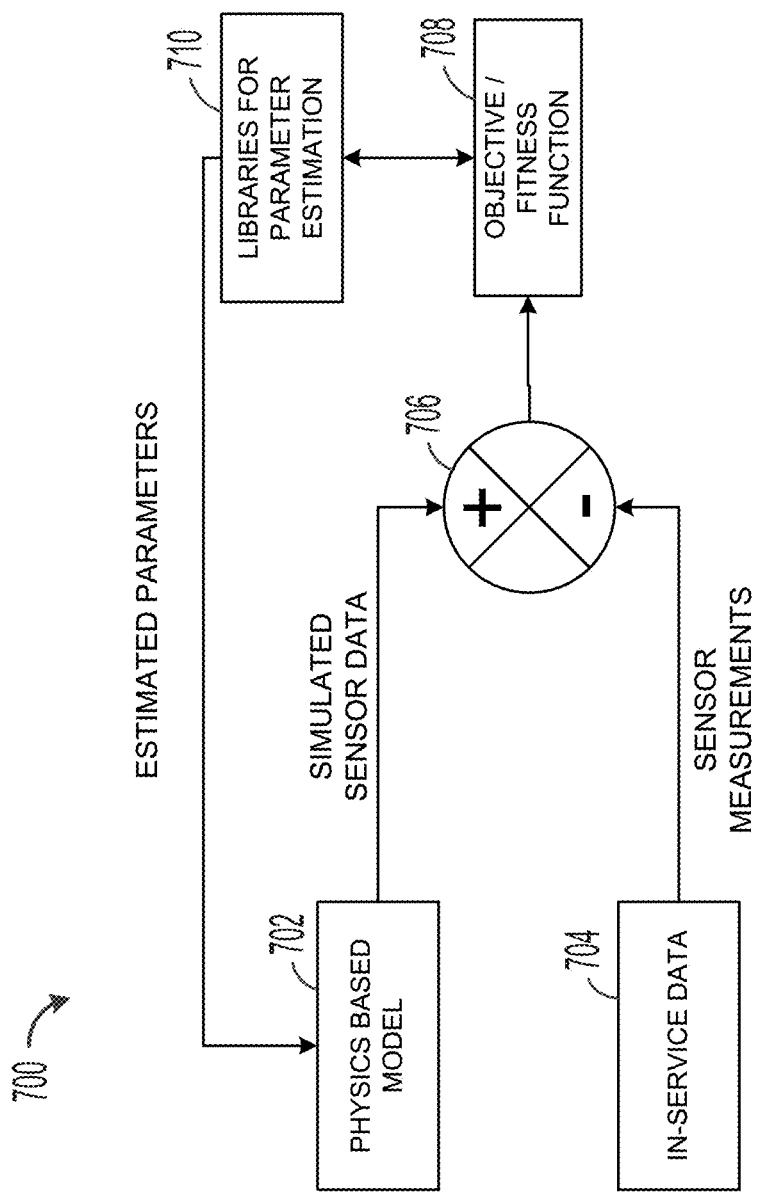
FIG. 7 illustrates another parameter estimation and evaluation technique, according to an example implementation.

FIG. 7 illustrates another parameter estimation technique 700, according to an example implementation. A computing system performing the technique 700 may use a physics-based model 702 to obtain simulated sensor data and in-service data 704 to obtain sensor measurements that can be combined and input into an objective/fitness function 706. In some examples, the objective/fitness function 706 can be represented as follows:

$$F = \frac{1}{N}\sum_{i=1}^{N}(U_{l,i} - \hat{U}_{l,i})^2 \qquad [3]$$

The computing system may communicate information between the objective/fitness function and libraries for parameter estimation 708. The libraries for parameter estimation 708 can then be used by the computing system to determine and provide estimated parameters to the physics-based model 702. The above process can be repeated to refine parameter estimations until predefined criteria for the parameters is satisfied.

Figure 8:
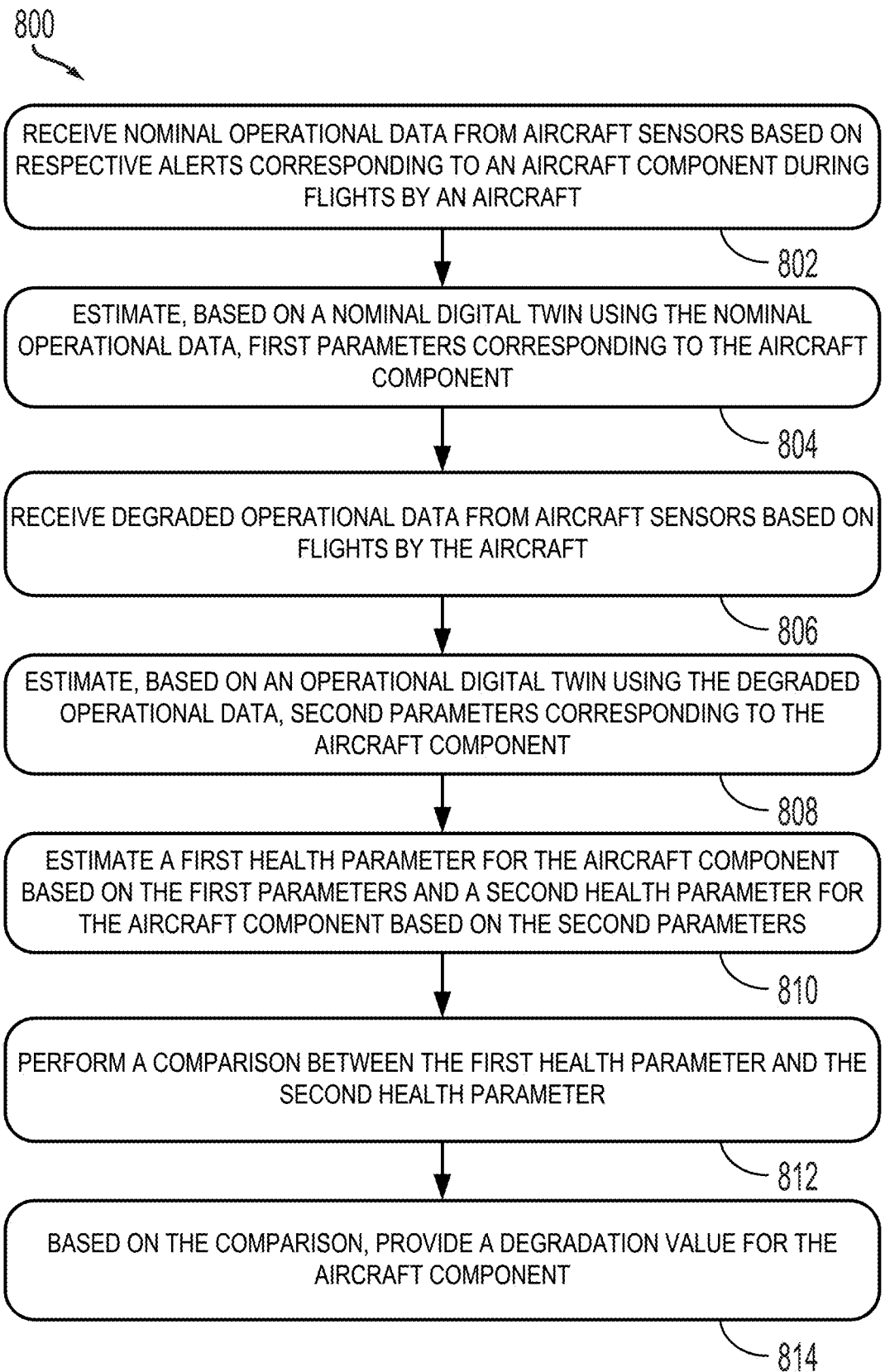
FIG. 8 shows a flowchart of a method for making a hybrid digital twin driven health prediction, according to an example implementation.

FIG. 8 shows a flowchart of a method, according to an example implementation. The method 800 presents an example method that could be used with the aircraft 100 shown in FIG. 1, the computing system 200 shown in FIG. 2, or other devices and systems disclosed herein. In other examples, components of the devices and/or systems may be arranged to be adapted to, capable of, or suited for performing the functions, when operated in a specific manner.

The method 800 can include one or more operations, functions, or actions as illustrated by one or more of blocks 802, 804, 806, 808, 810, 812, and 814. Although the blocks are illustrated in a particular order, these blocks may also be performed in parallel, and/or in a different order than those described herein. Also, the various blocks may be combined into fewer blocks, divided into additional blocks, and/or removed based upon the desired implementation.

At block 802, the method 800 involves receiving nominal operational data from aircraft sensors based on respective alerts corresponding to an aircraft component during flights by an aircraft. For instance, a computing system onboard the aircraft may receive the nominal operational data. In other cases, a remote computing system may receive the nominal operational data.

In some implementations, receiving nominal operational data involves identifying nominal windows during the plurality of flights by aircraft and receiving nominal operational data corresponding to the nominal windows from an aircraft condition monitoring system (ACMS) on the aircraft.

At block 804, the method 800 involves estimating, based on a nominal digital twin using the nominal operational data, first parameters corresponding to an aircraft component. In some examples, the nominal digital twin uses portions of the nominal operational data outside the respective alerts corresponding to the aircraft component to estimate the first parameters corresponding to the aircraft component.

In some examples, the aircraft component is coupled to the aircraft. For instance, the computing system estimates first parameters corresponding to a heat exchanger on the aircraft in some implementations. In some cases, the computing system estimates the first parameters corresponding to the aircraft component using a non-linear least squares estimation technique. In addition, the computing system or another device may calibrate the nominal digital twin using a non-linear least square estimation technique and/or a Meta heuristic technique. The Meta heuristic technique is a particle swarm optimization (PSO) technique in some implementations. As such, in some implementations, the nominal digital twin is part of a hybrid digital twin that also includes an operational digital twin.

At block 806, the method 800 involves receiving degraded operational data from the aircraft sensors based on the flights by the aircraft. In some instances, receiving degraded operational data involves identifying given windows during the plurality of flights by aircraft that include a maintenance message or warning corresponding to the aircraft component and receiving degraded operational data corresponding to the given windows from the ACMS on the aircraft.

At block 808, the method 800 involves estimating, based on an operational digital twin using the degraded operational data, second parameters corresponding to the aircraft component. For instance, the computing system estimates second parameters corresponding to the heat exchanger on the aircraft in some implementations.

At block 810, the method 800 involves estimating a first health parameter for the aircraft component based on the first parameters and a second health parameter for the aircraft component based on the second parameters. In some examples, the computing system estimates, based on the first parameters, a nominal heat transfer coefficient for the heat exchanger and estimates, based on the second parameters, an operational heat transfer coefficient for the heat exchanger.

At block 812, the method 800 involves performing a comparison between the first health parameter and the second health parameter. In some examples, the computing system performs the comparison between the nominal heat transfer coefficient and the operational heat transfer coefficient and determines a deviation of the operational heat transfer coefficient relative to the nominal heat transfer coefficient.

In some implementations, the computing system propagates a drift between the operational heat transfer coefficient and the nominal heat transfer coefficient over the plurality of flights by the aircraft.

At block 814, the method 800 involves providing, based on the comparison between the first health parameter and the second health parameter, a degradation value for the aircraft component. The degradation value represents the health of the aircraft component. In some cases, the computing system estimates the degradation value based on the deviation of the operational heat transfer coefficient relative to the nominal heat transfer coefficient. In addition, the computing system may provide the degradation value for the aircraft component in real-time during subsequent flight by the aircraft.

In some implementations, the computing system compares the degradation value to a threshold value. Based on the degradation value exceeding the threshold value, the computing system provides an alert. For instance, the computing system may provide an audiovisual alert to one or more remote computing devices.

Some aircraft include multiple heat exchangers, such as a first heat exchanger and a second exchanger. In some instances, the computing system performs an additional comparison between the degradation value for the first heat exchanger and a second degradation value for the second heat exchanger. As such, based on the additional comparison, the computing system may provide an alert (e.g., an audiovisual alert to pilots and a remote computing device).

By the term "substantially" or "about" used herein, it is meant that the recited characteristic, parameter, or value need not be achieved exactly, but that deviations or variations, including for example, measurement error, measurement accuracy limitations, friction, and other factors known to skill in the art, may occur in amounts that do not preclude and/or occlude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for predicting a health of an aircraft component based on a hybrid digital twin, the method comprising:
receiving, at a computing system, nominal operational data from at least one aircraft sensor based on respective alerts corresponding to the aircraft component during a plurality of flights by an aircraft, wherein the aircraft component is coupled to the aircraft;
estimating, by the computing system and based on a nominal digital twin using the nominal operational data, first parameters corresponding to the aircraft component, wherein the nominal digital twin uses portions of the nominal operational data outside the respective alerts corresponding to the aircraft component to estimate the first parameters corresponding to the aircraft component;
receiving, at the computing system, operational data from the at least one aircraft sensor based on the plurality of flights by the aircraft;
estimating, by the computing system and based on an operational digital twin using the operational data, second parameters corresponding to the aircraft component;
estimating a first health parameter for the aircraft component based on the first parameters and a second health parameter for the aircraft component based on the second parameters;
performing, by the computing system, a comparison between the first health parameter and the second health parameter; and
based on the comparison between the first health parameter and the second health parameter, providing a value for the aircraft component, wherein the value represents the health of the aircraft component.

2. The method of claim 1, wherein receiving nominal operational data comprises:
identifying nominal windows that are outside the respective alerts corresponding to the aircraft component during the plurality of flights by the aircraft; and
receiving nominal operational data corresponding to the nominal windows from an aircraft condition monitoring system (ACMS) on the aircraft.

3. The method of claim 2, further comprising:
identifying given windows during the plurality of flights by the aircraft that include a maintenance message corresponding to the aircraft component; and
receiving operational data corresponding to the given windows from the ACMS on the aircraft.

4. The method of claim 1, wherein estimating first parameters corresponding to the aircraft component comprises:
estimating first parameters corresponding to a heat exchanger on the aircraft.

5. The method of claim 4, wherein estimating second parameters corresponding to the aircraft component comprises:
estimating second parameters corresponding to the heat exchanger on the aircraft.

6. The method of claim 5, wherein estimating the first health parameter for the aircraft component based on the first parameters and the second health parameter for the aircraft component based on the second parameters comprises:
estimating, based on the first parameters, a nominal heat transfer coefficient for the heat exchanger; and
estimating, based on the second parameters, an operational heat transfer coefficient for the heat exchanger.

7. The method of claim 6, wherein performing the comparison between the first health parameter and the second health parameter comprises:
performing the comparison between the nominal heat transfer coefficient and the operational heat transfer coefficient; and
determining a deviation of the operational heat transfer coefficient relative to the nominal heat transfer coefficient.

8. The method of claim 7, further comprising:
propagating a drift between the operational heat transfer coefficient and the nominal heat transfer coefficient over the plurality of flights by the aircraft.

9. The method of claim 7, wherein providing the value for the aircraft component comprises:
estimating the value based on the deviation of the operational heat transfer coefficient relative to the nominal heat transfer coefficient.

10. The method of claim 1, further comprising:
comparing the value to a threshold value; and
based on the value exceeding the threshold value, providing an alert.

11. The method of claim 10, wherein providing the alert comprises:
providing an audiovisual alert to one or more remote computing devices.

12. The method of claim 1, wherein the aircraft component is a first heat exchanger of the aircraft, and wherein the aircraft includes a second heat exchanger.

13. The method of claim 12, further comprising:
performing an additional comparison between the value for the first heat exchanger and a second value for the second heat exchanger; and
based on the additional comparison, providing an alert.

14. The method of claim 1, wherein estimating first parameters corresponding to the aircraft component comprises:
estimating the first parameters corresponding to the aircraft component using a non-linear least squares estimation technique.

15. The method of claim 1, further comprising:
calibrating the nominal digital twin using a non-linear least square estimation technique and a meta heuristic technique.

16. The method of claim 15, wherein the meta heuristic technique is a particle swarm optimization technique.

17. The method of claim 1, wherein the hybrid digital twin comprises the nominal digital twin and the operational digital twin.

18. A system for predicting a health of an aircraft component based on a hybrid digital twin, the system comprising:
- an aircraft having at least one aircraft sensor and the aircraft component; and
- a computing system configured to:
  - receive nominal operational data from at least one aircraft sensor based on respective alerts corresponding to the aircraft component during a plurality of flights by an aircraft;
  - estimate, based on a nominal digital twin using the nominal operational data, first parameters corresponding to the aircraft component, wherein the nominal digital twin uses portions of the nominal operational data outside the respective alerts corresponding to the aircraft component to estimate the first parameters corresponding to the aircraft component;
  - receive operational data from the at least one aircraft sensor based on the plurality of flights by the aircraft;
  - estimate, based on an operational digital twin using the operational data, second parameters corresponding to the aircraft component;
  - estimate a first health parameter for the aircraft component based on the first parameters and a second health parameter for the aircraft component based on the second parameters;
  - perform a comparison between the first health parameter for the aircraft component and the second health parameter for the aircraft component; and
  - based on the comparison between the first health parameter and the second health parameter, provide a value for the aircraft component, wherein the value represents the health of the aircraft component.

19. The system of claim 18, wherein the computing system is coupled to the aircraft, and wherein the computing system is further configured to:
- provide the value for the aircraft component in real-time during subsequent flight by the aircraft.

20. A non-transitory computer readable medium having stored therein instructions executable by one or more processors to cause a computing system to perform functions comprising:
- receiving nominal operational data from at least one aircraft sensor based on respective alerts corresponding to an aircraft component during a plurality of flights by an aircraft, wherein the aircraft component is coupled to the aircraft;
- estimating, based on a nominal digital twin using the nominal operational data, first parameters corresponding to the aircraft component, wherein the nominal digital twin uses portions of the nominal operational data outside the respective alerts corresponding to the aircraft component to estimate the first parameters corresponding to the aircraft component;
- receiving operational data from the at least one aircraft sensor based on the plurality of flights by the aircraft;
- estimating, based on an operational digital twin using the operational data, second parameters corresponding to the aircraft component;
- estimating a first health parameter for the aircraft component based on the first parameters and a second health parameter for the aircraft component based on the second parameters;
- performing a comparison between the first health parameter and the second health parameter; and
- based on the comparison between the first health parameter and the second health parameter, providing a value for the aircraft component, wherein the value represents a health of the aircraft component.

* * * * *